(12) United States Patent
Smyth et al.

(10) Patent No.: US 12,732,697 B2
(45) Date of Patent: Sep. 8, 2026

(54) CAMERA SYSTEMS WITH IMPROVED ACTUATOR STABILITY

(71) Applicant: Apple Inc., Cupertino, CA (US)

(72) Inventors: Nicholas D. Smyth, San Jose, CA (US); Jason T. Weaver, Morgan Hill, CA (US); Ross A. Williams, Los Gatos, CA (US); Zirui Zhai, San Diego, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 18/622,161

(22) Filed: Mar. 29, 2024

(65) Prior Publication Data

US 2024/0397177 A1 Nov. 28, 2024

Related U.S. Application Data

(60) Provisional application No. 63/468,168, filed on May 22, 2023.

(51) Int. Cl.
*H04N 23/68* (2023.01)
*G03B 3/10* (2021.01)
*H04N 23/54* (2023.01)
*H04N 23/57* (2023.01)

(52) U.S. Cl.
CPC ............. *H04N 23/687* (2023.01); *G03B 3/10* (2013.01); *H04N 23/54* (2023.01); *H04N 23/57* (2023.01)

(58) Field of Classification Search
None
See application file for complete search history.

(56) References Cited

U.S. PATENT DOCUMENTS

| | | | | |
|---|---|---|---|---|
| 9,134,503 | B2 | 9/2015 | Topliss | |
| 2005/0276172 | A1* | 12/2005 | Tsutsumi | H04N 23/68 369/44.14 |
| 2012/0081559 | A1* | 4/2012 | Sato | H04N 23/687 348/208.11 |
| 2015/0192784 | A1* | 7/2015 | Fujinaka | H04N 23/55 359/557 |
| 2022/0014677 | A1* | 1/2022 | Smyth | H04N 23/683 |

FOREIGN PATENT DOCUMENTS

| | | |
|---|---|---|
| WO | WO 14/100516 | 6/2014 |
| WO | WO 21/209766 | 10/2021 |
| WO | WO 21/230719 | 11/2021 |

* cited by examiner

*Primary Examiner* — Paul M Berardesca
(74) *Attorney, Agent, or Firm* — Brownstein Hyatt Faber Schreck, LLP

(57) ABSTRACT

Various embodiments disclosed herein include bearing actuator arrangements, as well as cameras and devices that incorporate these bearing actuator arrangements. The bearing actuator arrangements described herein include a preloading arrangement configured to provide a magnetic preloading force between two components of the bearing actuator arrangement. The preloading assembly includes a magnet and a set of preloading plates positioned within a magnetic field of the magnet.

17 Claims, 14 Drawing Sheets

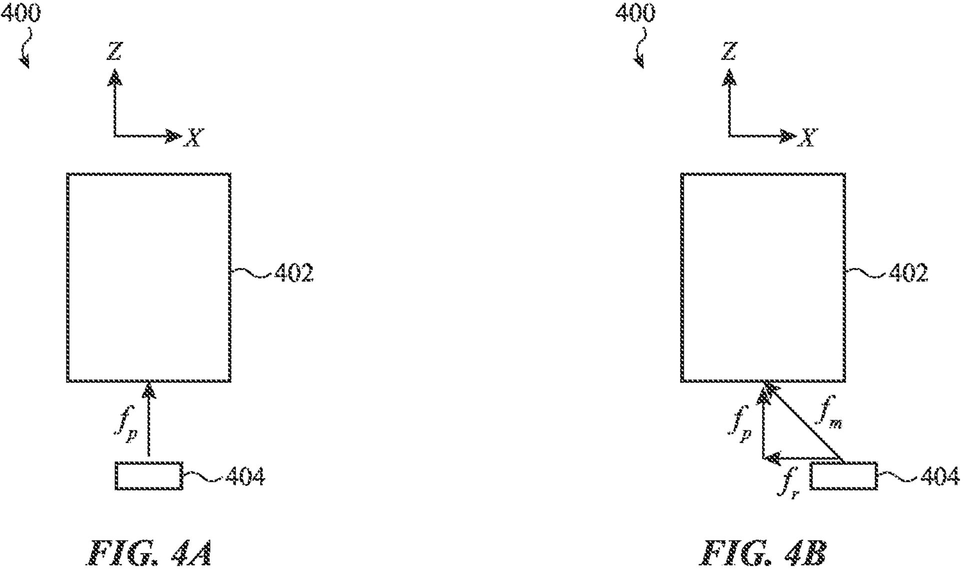
FIG. 4A
FIG. 4B
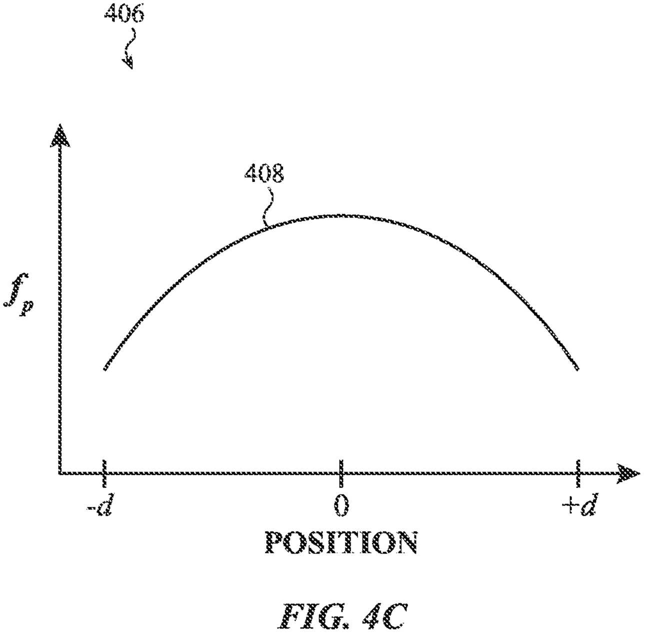
FIG. 4C

CAMERA SYSTEMS WITH IMPROVED ACTUATOR STABILITY

CROSS-REFERENCE TO RELATED APPLICATIONS

This application is a nonprovisional and claims the benefit under 35 U.S.C. 119 (e) of U.S. Provisional Patent Application No. 63/468,168, filed May 22, 2023, the contents of which are incorporated herein by reference as if fully disclosed herein.

FIELD

This disclosure relates to bearing actuators for use in camera systems, and more specifically preloading arrangements for providing magnetic preloading in bearing actuators.

BACKGROUND

Cameras continue to be an important feature of consumer electronics devices such as smartphones, tablets, and computers. Many of these cameras incorporate actuator mechanisms that allow for controlled relative movement between optical components of the cameras (e.g., between a lens assembly and an image sensor of the camera). In some instances, this relative movement adjusts the focal plane of the camera, which may facilitate autofocus capabilities in which the camera automatically adjusts the focus of the camera. Additionally or alternatively, lateral (i.e., perpendicular to an optical axis of the camera) relative movement between optical components may facilitate optical image stabilization capabilities in which the camera may sense and compensate for unexpected camera motion.

Some cameras may incorporate a bearing actuator to provide autofocus and/or optical image stabilization capabilities. In these instances, one or more stages are configured to move on ball bearings to facilitate movement of one or more components within the camera. These bearing actuators typically utilize magnetic preloading to maintain contact between the stages and the ball bearings, however this magnetic preloading may be sensitive to external forces that may be applied to the bearing actuator during operation. Accordingly, it may be desirable to provide a bearing actuator for a camera with improved stability.

SUMMARY

The present disclosure relates to bearing actuator arrangements, as well as cameras incorporated these bearing actuator arrangements. In some variations, a camera includes an optical image assembly having an image sensor and a lens assembly having one or more lens groups. The camera also includes a bearing actuator arrangement configured to move at least one component of the optical assembly, where the bearing actuator arrangement includes a preloading arrangement configured to provide a magnetic preloading force between a first component of the bearing actuator arrangement a second component of the bearing actuator arrangement. The preloading arrangement includes a magnet connected to the first component and having a magnetic field, and a set of preloading plates connected to the second component and positioned in the magnetic field.

In some embodiments, the magnet has a first surface facing the set of preloading plates and having a shape with a minor axis and major axis and the set of preloading plates includes at least one edge positioned at a non-zero angle relative to each of the minor axis and the major axis. In some of these variations, the shape of the first surface is a rectangle. Additionally or alternatively, the set of preloading plates includes a first preloading plate and a second preloading plate. The first preloading plate may include a first region having first and second parallel edges, and the first and second parallel edges of the first region of the first preloading plate are positioned at corresponding non-zero angles relative to each of the minor axis and the major axis. In some of these variations, second preloading plate includes a first region having first and second parallel edges, and the first and second parallel edges of the first region of the second preloading plate are positioned at corresponding non-zero angles relative to each of the minor axis and the major axis. Additionally or alternatively, the set of preloading plates is symmetric across an axis of symmetry positioned between the first preloading plate and the second preloading plate.

In some variations, the bearing actuator arrangement includes a first stage and a second stage that are separated by one or more sets of ball bearings. The first component of the bearing actuator arrangement is the first stage, and the second component of the bearing actuator arrangement is the second stage. In some of these variations, the bearing actuator arrangement includes a third stage positioned between the first stage and the second stage, such that the first stage is separated from the third stage by a first set of ball bearings. In other variations, the set of preloading plates includes a first preloading plate having a first arm and second arm, in which the first arm has a pair of edges positioned at corresponding non-zero angles relative to each of the minor axis and the major axis and the second arm has a pair of edges positioned at corresponding non-zero angles relative to each of the minor axis and the major axis.

In other embodiments, the set of preloading plates each has a grid shape. In some of these variations, the set of preloading plates includes a first preloading plate that defines a set of apertures extending therethrough. In some of these variations, each of the set of apertures of the first preloading plate has a rectangular shape. In some instances, the set of preloading plates further includes a second preloading plate that defines a set of apertures extending therethrough. In some instances, the set of preloading plates is symmetric across an axis of symmetry positioned between the first preloading plate and the second preloading plate. Additionally or alternatively, the first preloading plate is symmetric across a first axis of symmetry and across a second axis of symmetry. In some variations, the first preloading plate includes a first tab portion extending from a first side of the first preloading plate. In some of these variations, the first preloading plate comprises a second tab portion extending from a second side of the first preloading plate opposite the first side.

In still other embodiments, the set of preloading plates includes a preloading plate that has a region with a varying width defined between a first curved edge and a second curved edge. In some of these variations, the first curved edge and the second curved edge are concave curves. Additionally or alternatively, the preloading plate includes a tab portion extending from a side of the preloading plate.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIGS. 4A and 4B depict side views of an example preloading arrangement. FIG. 4C shows a graph of a magnetic preload force as a function of displacement between the preloading plate and the magnet of the preloading arrangement of FIGS. 4A and 4B.

Figure 1A:
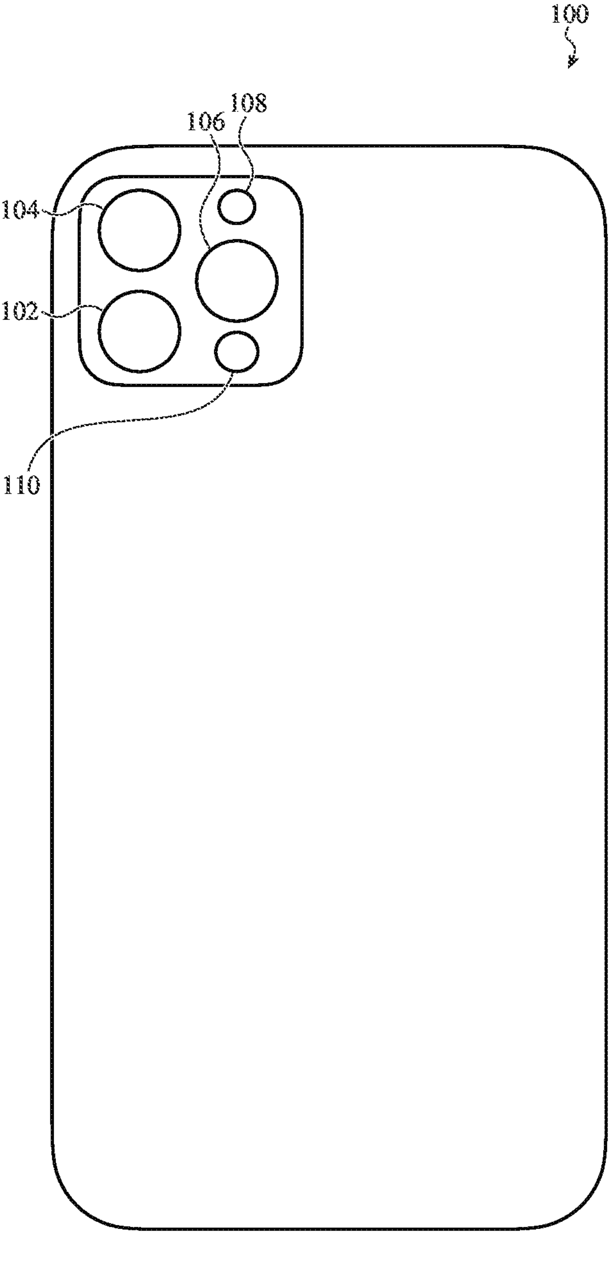
FIG. 1A illustrates a device as described herein having a camera with a bearing actuator arrangement as described herein.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top," "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Various embodiments disclosed herein include bearing actuator arrangements, as well as cameras and devices that incorporate these bearing actuator arrangements. The bearing actuator arrangements described herein include a preloading arrangement configured to provide a magnetic preloading force between two components of the bearing actuator arrangement. The preloading arrangement includes a magnet and a set of preloading plates positioned within a magnetic field of the magnet. In some embodiments, the set of preloading plates may include one or more preloading plates having a grid shape. In other embodiments, one or more edges of a preloading plate may be positioned at a non-zero angle relative to each of a minor axis and a major axis of a side of a magnet facing the preloading plate.

These and other embodiments are discussed below with reference to FIGS. 1A-9B. However, those skilled in the art will readily appreciate that the detailed description given herein with respect to these Figures is for explanatory purposes only and should not be construed as limiting.

The bearing actuator arrangements described herein may be incorporated into a camera, which in turn may be incorporated into an electronic device such as a phone, tablet, computer, or the like. FIG. 1A depicts an example device 100 as described herein. As shown there, the device 100 includes a first camera 102 having a bearing actuator arrangement. The bearing actuator arrangement allows the first camera 102 to selectively adjust the position of an optical component (e.g., a lens or image sensor) within the first camera 102.

In some instances, the first camera 102 is part of a multi-camera system. For example, in the variation shown in FIG. 1A, the first camera 102 is part of a multi-camera system having a second camera 104, and a third camera 106. The second camera 104 and/or third camera 106 may also include bearing actuator arrangements as described herein, but need not. It should be appreciated that the device 100 may include a single camera, or a multi-camera system having any number of cameras (with any relative positioning) as may be desired. Additionally, while shown as placed on the rear of a device 100, it should be appreciated that a camera having a bearing actuator arrangement may be additionally or alternatively placed on the front (e.g., a front side having a display) or any other side of the device as desired.

In some instances, the device 100 may include a flash module 108. The flash module 108 may provide illumination to some or all of the fields of view of the cameras of the device (e.g., the fields of view of the first camera 102, the second camera 104, and/or the third camera 106). This may assist with image capture operations in low light settings. Additionally or alternatively, the device 100 may further include a depth sensor 110 that may calculate depth information for a portion of the environment around the device 100. Specifically, the depth sensor 110 may calculate depth information within a field of coverage (i.e., the widest lateral extent to which the depth sensor is capable of providing depth information). The field of coverage of the depth sensor 110 may at least partially overlap the field of view of one or more of the cameras (e.g., the fields of view of the first camera 102, second camera 104, and/or third camera 106). The depth sensor 110 may be any suitable system that is capable of calculating the distance between the depth sensor 110 and various points in the environment around the device 100.

The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time, or may only illuminate a subset of the field of coverage at a given time (e.g., via one or more spots, stripes, or other patterns that may either be fixed or may be scanned across the field of coverage). In instances where a depth sensor utilizes infrared illumination, this infrared illumination may be utilized in a range of ambient conditions without being perceived by a user.

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
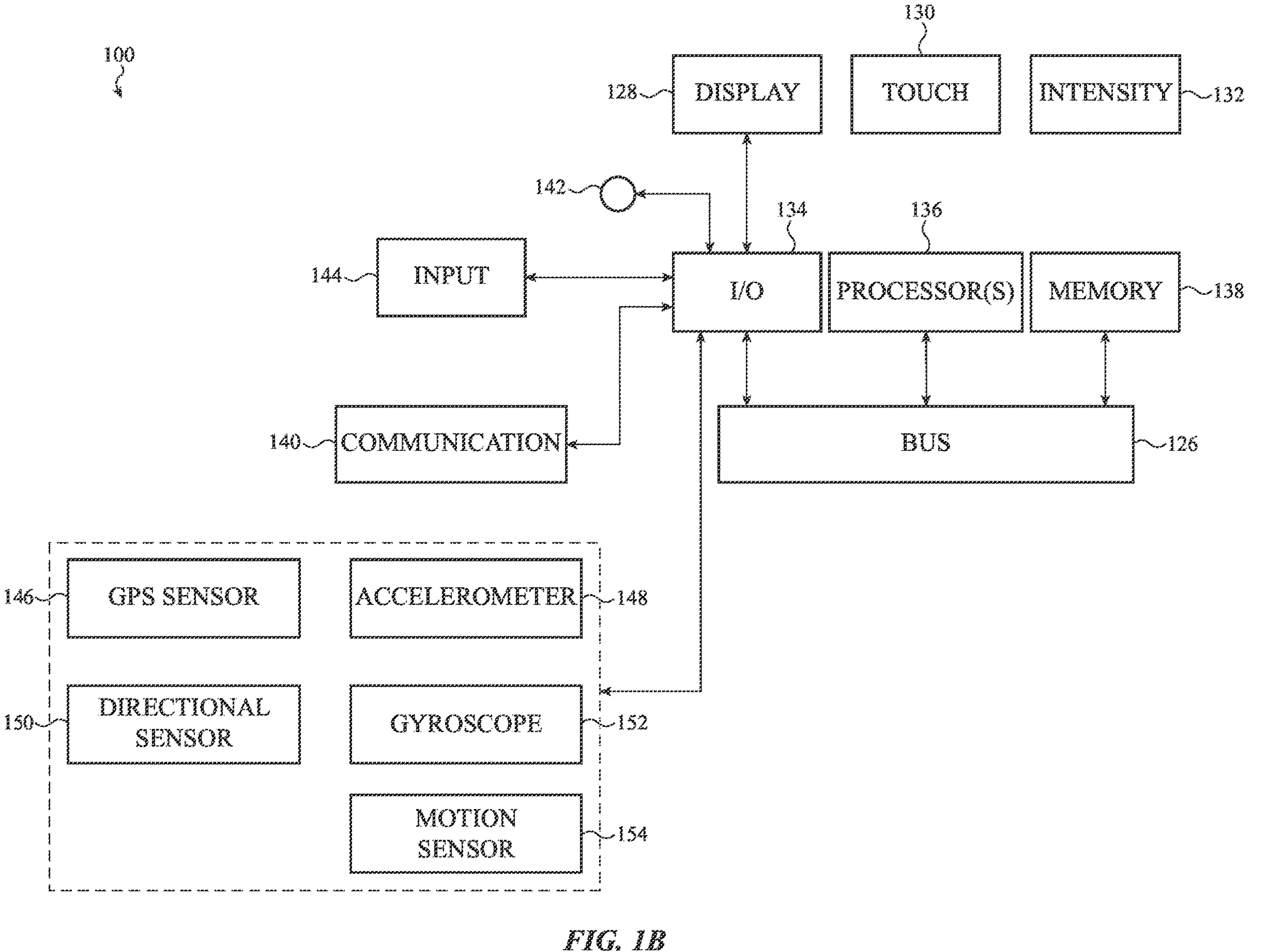
FIG. 1B depicts exemplary components of the device of FIG. 1A.

FIG. 1B depicts exemplary components of the device 100. In some embodiments, device 100 has a bus 126 that operatively couples an I/O section 134 with one or more computer processors 136 and memory 138. The I/O section 134 can be connected to display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. The device 100 can include input mechanisms 142 and/or 144. Input mechanism 142 is, optionally, a rotatable input device or a depressible and rotatable input device, for example. Input mechanism 142 is, optionally, a button, in some examples. The device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of the device 100 can include one or more non-transitory computer-readable storage mediums, for storing computer-executable instructions, which, when executed by one or more computer processors 136, for example, can cause the computer processors to perform the techniques that are described here (such as actuating the bearing actuator arrangements described herein). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images as described herein. Device 100 is not limited to the components and configuration of FIG. 1B, but can include other or additional components in multiple configurations.

Figure 1C:
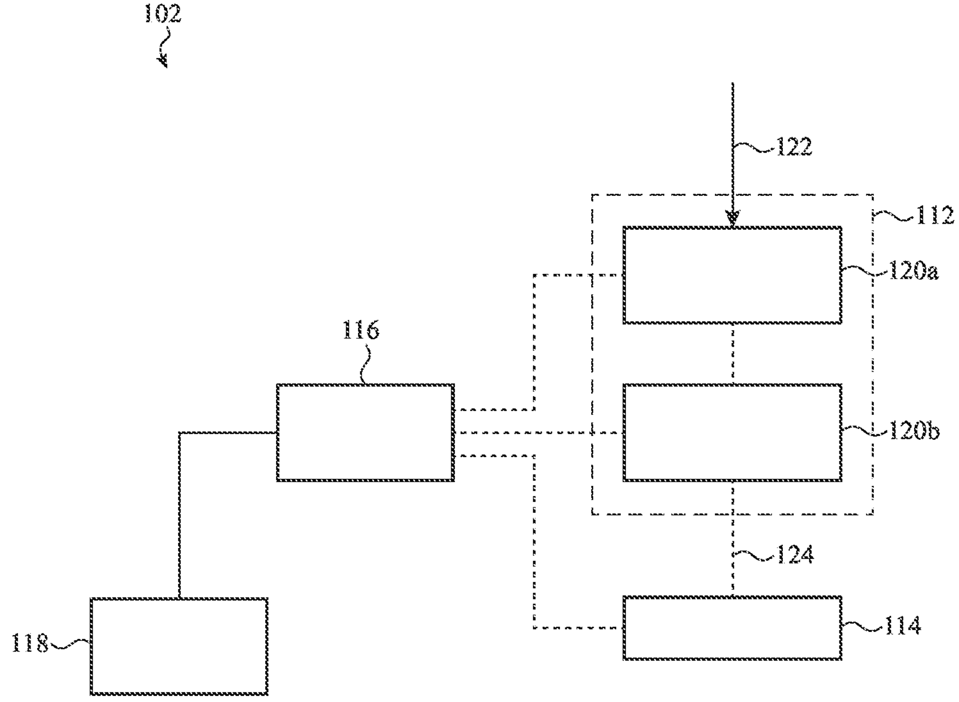
FIG. 1C illustrates the camera with the bearing actuator arrangement of FIG. 1A.

FIG. 1C illustrates components of the first camera 102 of the device 100 of FIG. 1A. The first camera 102 includes a lens assembly 112, an image sensor 114, a bearing actuator arrangement 116, and a controller 118. The lens assembly 112 and the image sensor 114 collectively form an optical assembly of the camera, which collects and measures light 112 entering the camera 102 to capture images.

Specifically, the lens assembly 112 includes one or more lens groups. For example, the lens assembly 112 shown in FIG. 1C includes a first lens group 120*a* and a second lens group 120*b*, though it should be appreciated that the lens assembly 112 may alternatively include a single lens group or three or more lens groups. Each lens group includes one or more lens elements (e.g., made from glass, plastic, or the like) that are configured to receive and refract light along an optical axis 124 of the camera 102. When the lens assembly 112 includes multiple lens groups, some of the lens groups may be moveable relative to other lens groups. For example, in the variation shown in FIG. 1C, the second lens group 120*b* is moveable relative to the first lens group 120*a* along the optical axis 124, which may adjust the focal length of the lens assembly 112.

The lens assembly 112 is positioned to receive light 122 entering the camera 102 from the environment (e.g., emitted and/or reflected from the scene surrounding the camera 102), and directs the light 112 along the optical axis 124 to the image sensor 114. For example, the first lens group 120*a* is positioned to receive the light 122 entering the camera 102 and directs the light 122 along the optical axis 124 to the second lens group 120*b*. The second lens group 120*b* directs the light 122 along the optical axis 124 to the image sensor 114. The image sensor 114 may be operated to capture images.

The bearing actuator arrangement 116 is configured to move one or more components of the optical assembly relative to a stationary element within the carrier. It should be appreciated that the term "stationary," when used herein in the context of a bearing actuator arrangement, is intended as a relative term to indicate that positioning of a particular component is fixed within the bearing actuator arrangement. Specifically, the bearing actuator arrangement may include one or more "moveable" components that may be moved relative to other "stationary" components of the bearing actuator arrangement. When such a bearing actuator arrangement is incorporated into a camera, it should be appreciated that this arrangement (including any stationary components thereof) need not remain stationary within the overall camera. Indeed, the entire bearing actuator arrangement may be moveable within the camera, while the bearing actuator arrangement may be controllable to create relative movement between its stationary and moveable components.

Depending on the design of the camera 102, the bearing actuator arrangement 116 may move any suitable moveable component or components of the optical assembly within the camera 102. For example, in some variations, the bearing actuator arrangement 116 is configured to move the image sensor 114 in one or more directions relative to a stationary component. In other variations, the bearing actuator arrangement 116 may be configured to move the lens assembly 112 in one or more directions relative to a stationary component. In instances where the lens assembly 112 includes multiple lens groups, the bearing actuator arrangement 116 may be configured to move one or more of the lens groups (e.g., the first lens group 120*a* or the second lens group 120*b*) relative to a stationary component. In some examples, the bearing actuator arrangement 116 may be configured to generate relative movement between the image sensor 114 and the lens assembly 112 (or one or more lens groups thereof), and/or relative movement between different lens groups of the lens assembly 112.

The bearing actuator arrangement 116 may be controlled by the controller 118 to set a position of the moveable component within the camera 102. This may move the moveable component relative to other components of the optical arrangement to change the focus and/or focal length of the camera 102, and/or to provide optical image stabilization. In some instances, the camera 102 may include one or more additional actuators (e.g., a bearing actuator arrangement as discussed herein, or another actuator such as a stepped motor, a voice coil motor actuator, a piezoelectric actuator, a leaf spring actuator, combinations thereof, and the like) that are configured to move other components of the optical assembly within the camera 102.

Figure 2:
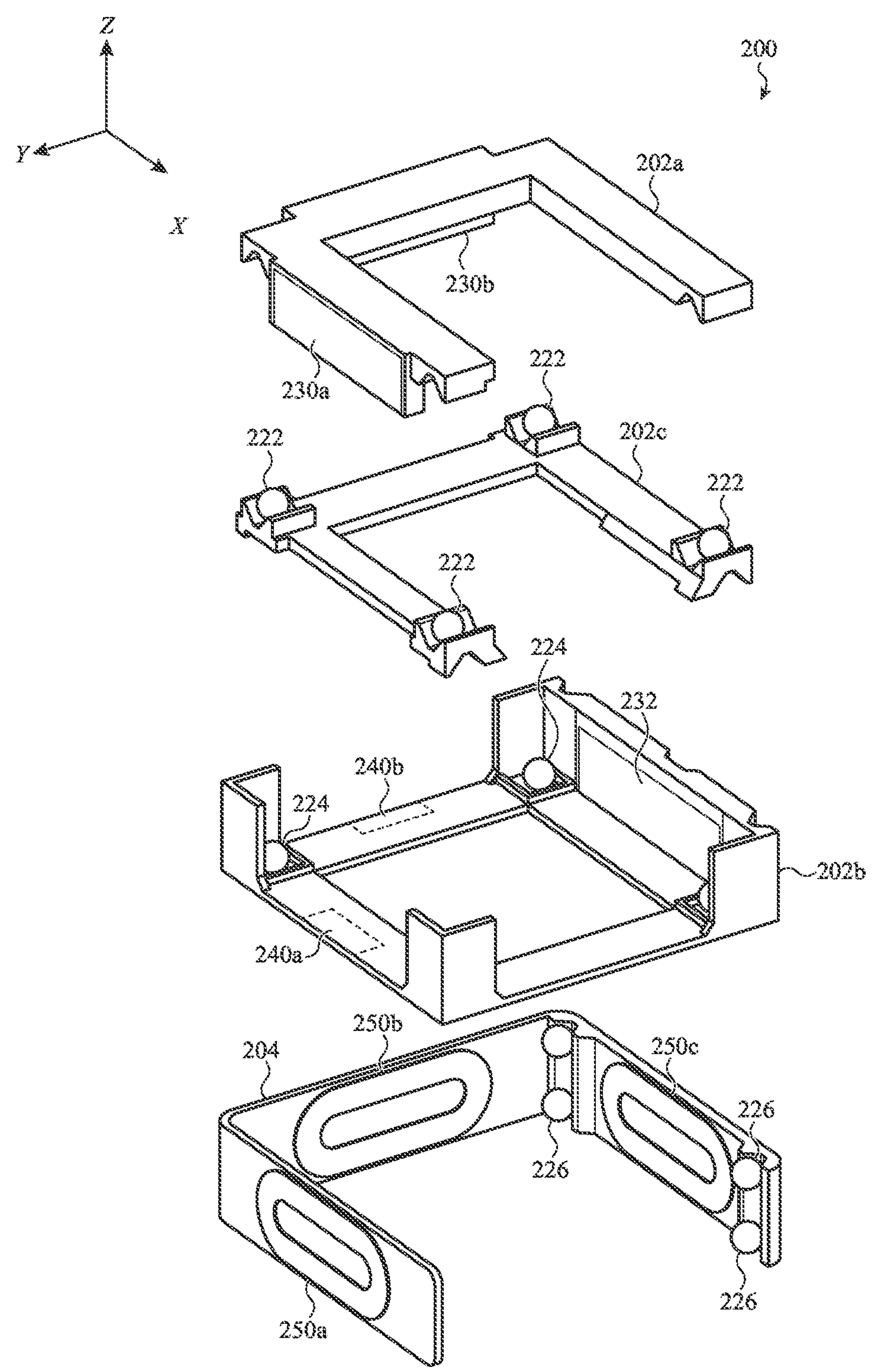
FIG. 2 shows an exploded perspective view of a variation of a bearing actuator arrangement including a set of preloading arrangements as described herein.

FIG. 2 shows an exploded view example of a bearing actuator arrangement 200 that may be used to move a component within a camera (such as the camera 102 of FIG. 1C). As shown the bearing actuator arrangement 200 includes a set of stages 202*a*-202*c*, each of which are moveable relative to a stationary base structure 204. A moveable component of an optical assembly (e.g., a lens assembly, a lens group, an image sensor or the like) is connected to one of the set of stages 202*a*-202*c*, and the set of stages 202*a*-202*c* is collectively configured to move the moveable component in one or more directions relative to the stationary base structure 204.

For example, in the variation shown in FIG. 2, the set of stages 202*a*-202*c* is configured to move a moveable component along three different axes relative to the stationary base structure 204. For case of illustration, FIG. 2 is depicted with a cartesian coordinate system with three mutually perpendicular axes (labeled X, Y, and Z). The set of stages 202*a*-202*c* includes a first stage 202*a*, a second stage 202*b*, and a third stage 202*c* positioned between the first stage 202*a* and the second stage 202*c*. The first stage 202*a* is moveably connected to the third stage 202*c* via a first set of ball bearings 222 (hereinafter referred to as Y-axis ball bearings), such that the first stage 202*a* is moveable relative to the third stage 202*c* along the Y-axis. When the bearing actuator arrangement 200 is assembled, the first stage 202*a* and the third stage 202*c* are pressed into contact with the Y-axis ball bearings 222 via magnetic preloading, as will be discussed in more detail herein. The Y-axis ball bearings 222 are positioned in one or more tracks (defined by one or both of the first stage 202*a* and the third stage 202*c*). These tracks may allow for movement of the Y-axis ball bearings 222 along the Y-axis, but restrict movement of the Y-axis ball bearings 222 along the X-axis. In this way, the first stage 202*a* is moveable relative to the third stage 202*c* along the Y-axis, but may be fixed relative to the third stage 202*c* along the X-axis.

Similarly, the third stage 202*c* is moveably connected to the second stage 202*b* via a second set of ball bearings 224 (hereinafter referred to as X-axis ball bearings), such that the third stage 202*c* is moveable relative to the second stage 202*b* along the X-axis. When the bearing actuator arrangement 200 is assembled, the second stage 202*b* and the third stage 202*c* are pressed into contact with the X-axis ball bearings 224 via magnetic preloading. The X-axis ball bearings 224 are positioned in one or more tracks (defined by one or both of the second stage 202*b* and the third stage 202*c*). These tracks may allow for movement of the X-axis ball bearings 224 along the X-axis, but restrict movement of the X-axis ball bearings 224 along the Y-axis. In this way, the third stage 202*c* is moveable relative to the second stage 202*b* along the X-axis, but may be fixed relative to the second stage 202*b* along the Y-axis.

Movement of the third stage 202*c* relative to the second stage 202*b* along the X-axis may also, due to the engagement with the Y-axis ball bearings 222, move the first stage 202*a* relative to the second stage 202*b* along the X-axis. As a result, the first stage 202*a* is moveable relative to the second stage 202*b* and the stationary base structure 204 both along the X-axis (e.g., via relative movement between the second stage 202*b* and the third stage 202*c* along the X-axis) and along the Y-axis (e.g., via relative movement between the first stage 202*a* and the third stage 202*c* along the Y-axis). If a moveable component of the optical assembly is fixedly coupled with the first stage 202*a*, the moveable component may be similarly moved relative to the stationary base structure 204 along both the X- and Y-axes.

In some instances, the second stage 202*b* is moveable relative to the stationary base structure 204 along the Z-axis via a third set of ball bearings 226 (hereinafter refer to as Z-axis ball bearings). When the bearing actuator arrangement 200 is assembled, the second stage 202*b* and the stationary base structure 204 are pressed into contact with the Z-axis ball bearings 226 via magnetic preloading. The Z-axis ball bearings 226 are positioned in one or more tracks (defined by one or both of the second stage 202*b* and the stationary base structure 204). These tracks may allow for movement of the Z-axis ball bearings 224 along the Z-axis, but restrict movement of the Z-axis ball bearings 224 along the X- or Y-axis. Movement of the second stage 202*b* along the Z-axis may also, due to engagement with the third stage 202*c* and the first stage 202*a* via the Y-axis and X-axis ball bearings 222, 224, move the third stage 202*c* and the first stage 202*a* along the Z-axis.

The bearing actuator arrangement 200 may include one or more magnets that may facilitate movement and/or preloading of the set of stages 202*a*-202*c*. For example, in the variation shown in FIG. 2, the bearing actuator arrangement 200 includes a first set of magnets attached to the first stage 202*a*, and a second set of magnets of magnets attached to the second stage 202*b*. Specifically, the first set of magnets includes a first magnet 230*a* and a second magnet 230*b* that are attached to different sides of the first stage 202*a*, and the second set of magnets includes a third magnet 232.

Some or all of the magnets may be part of voice coil motor actuators that are responsible for moving one or more of the set of stages 202*a*-202*c* relative to the stationary base structure 204. As shown in FIG. 2, the bearing actuator arrangement 200 includes a set of coils 250*a*-250*c*. The set of coils includes a first coil 250*a*, a second coil 250*b*, and a third coil 250*c*, each of which may be attached to or otherwise held in a fixed relationship with the stationary base structure 204. The first coil 250*a* and the first magnet 230*a* may collectively form a first voice coil motor actuator (hereinafter referred to as a "Y-axis actuator"). When the bearing actuator arrangement 200 is assembled, the first coil 250*a* is positioned within the magnetic field of the first magnet 230*a*, such that when a current is run through the first coil 250*a*, a Lorentz force between the first magnet 230*a* and the first coil 250*a* will be generated along the Y-axis. This Lorentz force may move the first stage 202*a* relative to both the third stage 202*c* and the stationary base structure 204 along the Y-axis. Accordingly, when a moveable component is fixedly coupled with the first stage 202*a*, the Y-axis actuator will control movement of the moveable component along the Y-axis.

Similarly, the second coil 250*b* and the second magnet 230*b* form a second voice coil motor actuator (hereinafter referred to as an "X-axis actuator"). The second coil 250*b* is positioned within the magnetic field of the second magnet 230*b* such that when a current is run through the second coil 250*b*, a Lorentz force between the second magnet 230*b* and the second coil 250*b* will be generated along the X-axis. This Lorentz force will move the first stage 202*a* and the third stage 202*c* relative to the second stage 202*b* and the stationary base structure 204 along the X-axis. Accordingly, the X-axis actuator may be used to control movement of the moveable component along the X-axis.

The third coil 250*c* and the third magnet 232 may form a third voice coil motor actuator (hereinafter referred to as a "Z-axis actuator"). The third coil 250*c* is positioned within the magnetic field of the third magnet 232 such that when a current is run through the third coil 250*c*, a Lorentz force between the third magnet 232 and the third coil 250*c* will be generated along the Z-axis. This Lorentz force will move the second stage 202*b* (and with it, the first stage 202*a* and the third stage 202*c*) relative to the stationary base structure 204 along the Z-axis. Accordingly, the Z-axis actuator may be used to control movement of the moveable component along the Z-axis.

Some or all of the magnets may be used to help provide magnetic preloading to the set of stages 202*a*-202*c*, which may help to hold different stages in contact with one or more sets of ball bearings. For example, the bearing actuator arrangement 200 of FIG. 2 includes a first preloading plate 240*a* and a second preloading plate 240*b*, each of which is attached to or otherwise integrated into the second stage 202*b*. The first preloading plate 240*a* is formed from a ferritic material (e.g., steel) and is positioned within the magnetic field of the first magnet 230*a* (e.g., to form a first preloading arrangement), such that the first preloading plate 240*a* is magnetically attracted to the first magnet 230*a* during operation of the bearing actuator arrangement 200. This magnetic attraction pulls the first stage 202*a* toward the second stage 202*b*, thereby urging the first stage 202*a* and third stage 202*c* into contact with the Y-axis ball bearings 222, and the third stage 202*c* and the second stage 202*b* into contact with the X-axis ball bearings 224. Similarly, the second preloading plate 240*b* is formed from a ferritic material (e.g., steel) and is positioned within the magnetic field of the second magnet 230*b* (e.g., to form a second preloading arrangement). The magnetic attraction between the second preloading plate 240*b* and the second magnet 230*b* may also contribute to the magnetic loading between the first stage 202 and the second stage 202*b*.

Additionally, in some variations the bearing actuator arrangement 200 may further comprise one or more additional ferritic preloading plates (not shown) attached to or otherwise integrated into the stationary base structure 204. This additional preloading plates may be positioned within the magnetic field of the third magnet 232 (e.g., to form a third preloading arrangement), and may provide a magnetic force that pulls the second stage 202*b* and the stationary base structure 204 into contact with the z-axis ball bearings 226, thereby providing magnetic preloading between second stage 202*b* and the stationary base structure 204. While the individual magnets of the bearing actuator arrangement 200 in FIG. 2 are used both for magnetic preloading and actuating movement of one or more of the set of stages 202*a*-202*c*, it should be appreciated that the bearing actuator arrangements described herein may include magnets that are utilized for magnetic preloading but not actuating movement, or vice versa.

It should also be appreciated that the bearing actuator arrangement 200 of FIG. 2 is just one example, and that the principles described herein may be applied to a wide range of bearing actuator arrangements that provide magnetic preloading to one or more stages thereof. Additional non-limiting examples of cameras that include bearing actuator arrangements are described in U.S. Pat. No. 11,375,091 (titled "Camera with folded optics and bearing suspension")

and U.S. Patent Application Publication No. US2022/0014677A1 (titled "Camera Actuator with Moving Coils and Dynamic Flex Circuit"), the contents of which are incorporated herein by reference in their entireties.

Figure 3A:
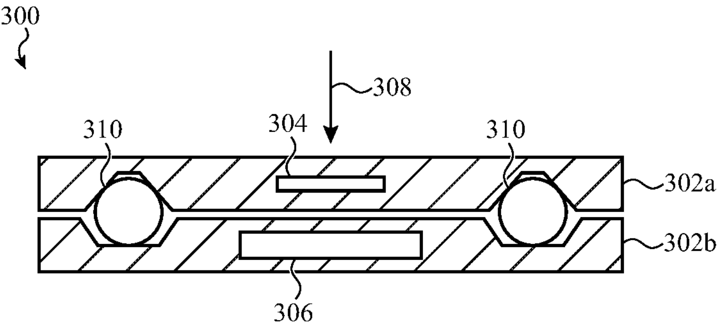
FIGS. 3A and 3B show partial cross-sectional side views of a variation of a bearing actuator arrangement including a preloading arrangement as described herein.
Figure 3B:
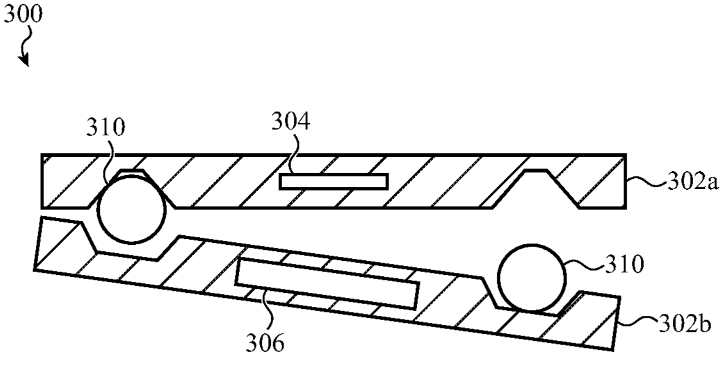

Magnetic preloading in camera bearing actuator arrangements is intended to keep the ball bearings in their tracks, regardless of the posture of the camera and under the application of externally applied forces to stages of the bearing actuator arrangement. That said, if the preloading force applied to a stage (e.g., relative to another stage or to a stationary base structure of the bearing actuator arrangement) is overcome by other forces, that stage may temporarily lose contact with its ball bearings. This is illustrated in FIGS. 3A and 3B, in which a bearing actuator arrangement 300 of a camera (not shown) includes a first stage 302*a* and a second stage 302*b* (shown in cross-section in FIGS. 3A and 3B). The first stage 302*a* includes a ferritic preloading plate 304 and the second stage 302*b* includes a magnet 306, such that the ferritic preloading plate 304 is magnetically attracted to the magnet 306 to form a preloading arrangement. This magnetic attraction pulls the first stage 302*a* toward the second stage 302*b* along direction 308 to magnetically preload the first stage 302*a* toward the second stage 302*b*. In the variation shown in FIGS. 3A and 3B, the first stage 302*a* and second stage 302*b* include a set of ball bearings 310 positioned therebetween, though it should be appreciated that the first stage 302*a* and the second stage 302*b* may be further separated by one or more intervening stages (and one or more additional sets of ball bearings), such as described with respect to the bearing actuator arrangement 200 of FIG. 2.

If the magnetic preloading force between the ferritic preloading plate 304 and the magnet 306 is sufficiently strong, the first stage 302*a* and the second stage 302*b* will be held in a particular relative alignment (e.g., in contact with the set of ball bearings 310, such as shown in FIG. 3A). If a force applied to one of the first stage 302*a* or the second stage 302*b*, however, overcomes the preloading force, the first stage 302*a* and the second stage 302*b* may temporarily lose its relative alignment (e.g., one or both of the first stage 302*a* and the second stage 302*b* may separate from one or more of the ball bearings 310, such as shown in FIG. 3B). This temporary loss of alignment may impact stability and control of the bearing actuator arrangement 300, may impact the quality of images captured by the camera, or otherwise negatively impact the operation of the camera.

Accordingly, it may be desirable for the bearing actuator arrangements described herein to have magnetic preloading that is strong enough to maintain alignment between components during normal operation of the bearing actuator arrangement. It should be understood, however, the magnetic preloading may impact multiple aspects of the operation of the bearing actuator arrangement. For example, if the magnetic preloading force between two components is too strong, this may increase friction that resists movement of the stages within the bearing actuator arrangement, which may impact the power and/or thermal impacts of operating the bearing actuator arrangement.

Additionally, movement of a moveable component within the camera may result in relative movement between a magnet and a preloading plate, which may thereby change the preloading force provided by that magnet/preloading plate pair. For example, FIGS. 4A and 4B depict side views of a portion of a preloading arrangement 400 that includes a magnet 402 and a ferritic preloading plate 404 (the stages of the preloading arrangement 400 incorporating these components are not shown). The magnet 402 and ferritic preloading plate 404 may be configured to provide a magnetic preloading force $f_p$ between two components (e.g., between two stages of the preloading arrangement 400, or between a stage and a stationary base structure of the preloading arrangement 400) along the Z-axis. While shown as providing a preloading force $f_p$ along the Z-axis, it should be appreciated that this preloading force may be applied along any axis as may be desired). For the purpose of illustration, the ferritic preloading plate 404 is configured as a rectangular sheet of ferritic material.

The preloading arrangement 400 may be configured such that the magnet 402 may move relative to the ferritic preloading plate 404 along the X-axis (and optionally along the Y-axis) during operation of the preloading arrangement 400 (e.g., via relative movement of the components carrying the magnet 402 and the ferritic preloading plat 404). When the ferritic preloading plate 404 is centered with respect to the magnet 402, such as shown in FIG. 4A, the magnetic force between magnet 402 and ferritic preloading plate 404 will be vertically oriented (i.e., along the Z-axis). As the ferritic preloading plate 404 is moved relative to the magnet 402 along the X-axis (such as when the preloading arrangement 400 is used to move a moveable component along the X-axis), as shown in FIG. 4A, the magnetic force $f_m$ between the ferritic preloading plate 404 and the magnet 402 will be angled with respect to the X- and Z-axes. Specifically, the magnetic force $f_m$ has a vertical component along the Z-axis that represents the magnetic preloading force $f_p$, and a horizontal component along the X-axis that represents a return force $f_r$.

The return force $f_r$ attempts to return the preloading plate 404 to the centered position along the X-axis, and thus resists movement of the preloading plate 404 away from the position of FIG. 4A. This return force $f_r$ need be overcome to allow for relative movement between the stages of the preloading arrangement 400, and thus a larger return force $f_r$ may make it harder to operate the preloading arrangement 400. This may thereby impact the power and/or thermal constraints of the camera, and thus it may be desirable to reduce the return force $f_r$ between the preloading plate 404 and the magnet 402.

Additionally, as the preloading plate 404 is moved further along X-axis, the preloading force $f_p$ decreases. FIG. 4C shows a graph 406 of the preload force $f_p$ as a function of relative position of the preloading plate 404, with 0 representing the preloading plate 404 centered with the magnet 402 along the X-axis, and +d and −d representing the maximum displacement of the preloading plate 404 along the X-axis during operation of the bearing actuator arrangement. The preloading force $f_p$, as indicated by line 408 in FIG. 4C, decreases as preloading plate 404 is moved relative to the magnet 402 along the X-axis. It should be appreciated that the graph 406 of FIG. 4C assumes a particular relative orientation between the magnet 402 and preloading plate 404 in the Y-axis, and that the preloading force $f_p$ may also change based on relative movement between these elements in the Y-axis. As the magnetic preloading force $f_p$ decreases, smaller forces are required to overcome the preloading force $f_p$ and cause displacement between the magnet 402 and preloading plate 404 along the Z-axis. This may be magnified as the stroke range of the preloading arrangement 400 increases. Accordingly, it may be desirable to reduce this force roll-off over the stroke range of the bearing actuator arrangement.

The bearing actuator arrangements described herein are configured to provide preloading forces balance these design considerations by reducing return force and improving the force roll-over over the stroke range while maintaining the maximum preloading force below a threshold level. Specifically, FIGS. 5A-9B depict aspects of bearing actuator arrangements in which a magnet and a set of preloading plates (collectively also referred to herein as a "preloading arrangement") are designed to provide a magnetic preloading force between two components of a bearing actuator arrangement. These components may be any two components that are moveable relative to each other during operation of the bearing actuator arrangement. For example, the preloading arrangements described herein may provide a magnetic preloading force between two stages of a bearing actuator arrangement or between a stage and a stationary base structure of a bearing actuator arrangement. The principles described with respect to these figures may be applied to any suitable bearing actuator arrangement that includes one or more moveable stages (e.g., moveable relative to another stage and/or to a stationary base structure via one or more sets of ball bearings), such as the bearing actuator arrangement 200 of FIG. 2.

Figure 5A:
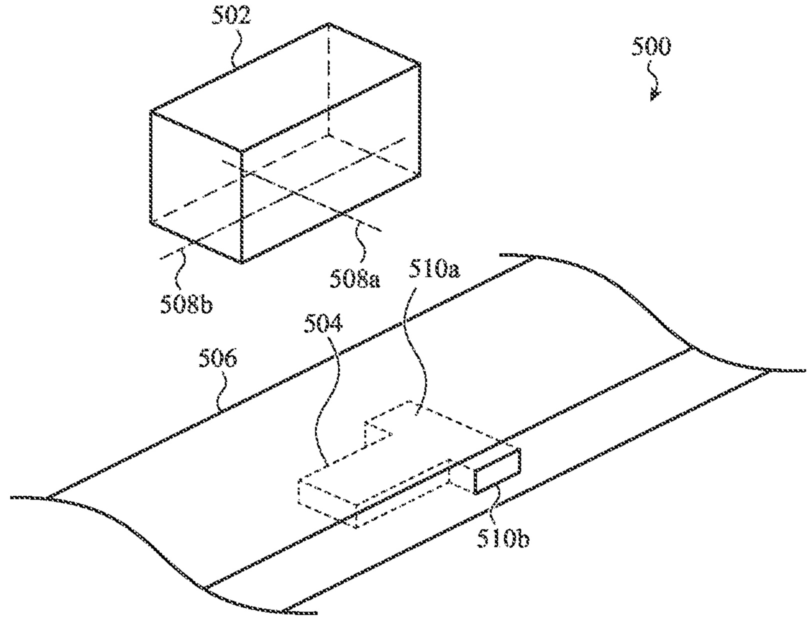
FIG. 5A depicts a perspective view of a variation of a preloading arrangement as described herein.

FIG. 5A shows a perspective view of a portion of a preloading arrangement 500 having a magnet 502 and a preloading plate 504. The magnet 502 may be connected to (e.g., attached to or otherwise incorporated into) a first component (not shown), such as a moveable stage or stationary base, of a bearing actuator arrangement, and may be positioned such that a first surface of the magnet 502 is positioned adjacent to the preloading plate 504. The first surface of the magnet 502 preferably has a rectangular shape, though it should be appreciated that in some instances the first side may have a non-rectangular shape (e.g., a trapezoid or the like). The first surface of the magnet 502 has a minor axis 508*a* (which represents a line crosses the center of the surface and encompasses the narrowest dimension of the shape) and major axis 508*b* perpendicular to the minor axis 508*a*. In the instance of a rectangle (or a rectangle with rounded edges), the minor axis 508*a* represents a width of the rectangle while the major axis 508*b* represents its length.

The preloading plate 504, which is formed from a ferritic material (e.g., steel), is connected to (e.g., attached to or otherwise incorporated into) a second component 506, such as a moveable stage or stationary based, of a bearing actuator. When the bearing actuator arrangement is assembled, the preloading plate 504 is positioned such that a first surface 510*a* of the preloading plate 504 faces the first surface of the magnet 502 and the preloading plate 504 is positioned within a magnetic field produced by the magnet 502.

The preloading plate 504 may be incorporated into the second component 506 in any manner. In some variations, the preloading plate 504 is incorporated into the second component 506 via an insert molding process, in which the second component 506 is molded over the preloading plate 504. In some instances, a portion of the preloading plate 504 may extend outside of a mold during the insert molding process (e.g., to position the preloading plate 504 within the second component 506). This external portion may be removed after the insert molding process, leaving an exposed surface 510*b*. This manufacturing approach, however, may provide constraints on possible shapes of the preloading plate 504, as it requires a portion (referred to herein as a "tab portion") of the preloading plate 504 to extend to an external surface of molded portion of the second component 506.

Figure 5B:
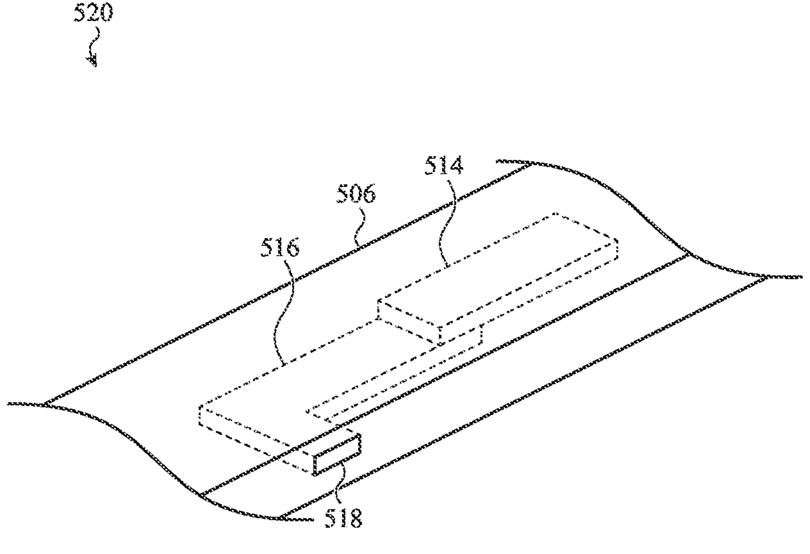
FIG. 5B depicts a perspective view of a variation of a preloading plate that may be used with the preloading arrangement of FIG. 5A.

FIG. 5B shows another variation of a preloading arrangement 520 that includes a preloading plate 514 incorporated into the second component 506. In this variation, the preloading plate 514 may also be incorporated into the second component 506 using an insert molding process, except that the preloading plate 514 is connected to another element 516 prior to the injection molding process. A portion of this element 516 (with may be another structural element of the moveable stage or preloading plate) may extend outside of a mold during the insert molding process (e.g., to position both the element 516 and preloading plate 514). In this way, while the element 516 may include an exposed surface 518, the entire preloading plate 514 may be positioned inside of the second component 506. This may allow for the preloading plate 514 to take on a wider range of shapes than the preloading plate 504 of FIG. 5A. In some variations, the element 516 may be formed from a non-ferritic material (e.g., a non-ferritic metal), such that the element 516 does not contribute to or otherwise impact the magnetic preloading provided by the preloading arrangement 520. The element 516 may also provide other functions to the second component 506 (e.g., may act as a frame to provide structural support to the second component 506).

Figure 6A:
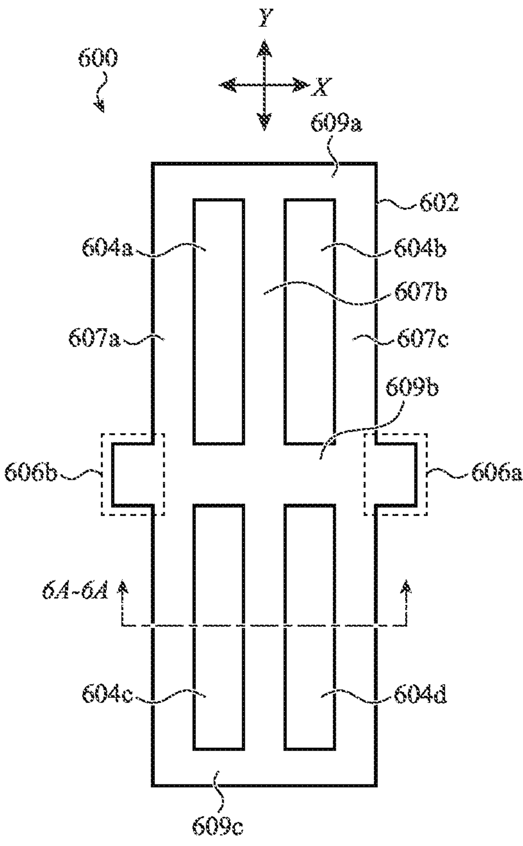
FIGS. 6A and 6B depict top and side views, respectively, of an example preloading arrangement as described herein.
Figure 6B:
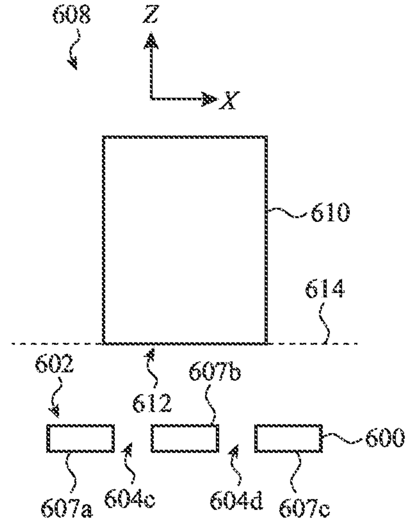

In some variations, a preloading arrangement of a bearing actuator arrangement includes a set of preloading plates each having a grid shape. In these instances, each preloading plate of this set of preloading plates includes a plurality of bars separated by apertures extending through the preloading plate. For example, FIG. 6A shows a top view of an example preloading plate 600 that may be used with the preloading arrangements described herein. Specifically, FIG. 6A shows a first surface 602 of the preloading plate 600. FIG. 6B shows a side view of a preloading arrangement 608 that includes the preloading plate 600 and a magnet 610. The preloading arrangement 608 may be arranged such that the first surface 602 of the preloading plate 600 faces a first surface 612 of the magnet 610. As discussed previously, the first surface 612 of the magnet 610 has a shape (e.g., a rectangular shape) having a minor axis 614 and a major axis (not shown) perpendicular to the minor axis.

The preloading plate 600 may define a set of apertures 604*a*-604*d* extending through preloading plate 600 (e.g., between the first surface 602 and a second surface opposite the first surface 602). Accordingly, the first surface 602 is shaped to have a first plurality of bars 607*a*-607*c* (referred to herein as "column bars" for ease of discussion) and a second plurality of bars 609*a*-609*c* (referred to herein as "row bars" for ease of discussion), such that each column bar is perpendicular to the row bars 607*a*-607*c*. Immediately adjacent columns bars are separated by one or more apertures of the set of apertures 604*a*-604*d* (e.g., column bars 607*a* and 607*b* are separated by both aperture 604*a* and aperture 604*c*, and column bars 607*b* and 607*c* are separated by both aperture 604*b* and aperture 604*d*). Similarly, adjacent row bars are separated by one or more apertures of the set of apertures 604*a*-604*d* (e.g., row bars 609*a* and 609*b* are separated by both aperture 604*a* and aperture 604*b*, and row bars 609*b* and 609*c* are separated by both aperture 604*c* and aperture 604*d*).

The preloading plate 600 may be positioned within the preloading arrangement 608 such that each of the plurality of column bars 607*a*-607*c* is parallel to the major axis of the first surface 612 of the magnet 610 and each of the plurality of row bars 609*a*-609*c* is parallel to the minor axis 614 of the first surface 612 of the magnet 610, such as shown in FIG. 6B. For the purpose of discussion, the preloading arrangement 608 is positioned to provide a preloading force along the Z-axis, though it should be appreciated that this preloading force may be applied along any axis as may be desired. The grid shape of the preloading plate 600 may reduce force roll-off over the stroke range of a bearing actuator arrangement incorporating the preloading arrangement 600, as compared to the preloading arrangement depicted in FIGS. 4A and 4B. Specifically, each of column bars 607*a*-607*c* and row bars 609*a*-609*c* contribute to the magnetic preloading force between the magnet 610 and the preloading plate 600. As the magnet 610 and preloading plate 600 are moved relative to each other, the various row and/or column bars may provide different relative contributions to the overall preloading force.

Figure 6C:
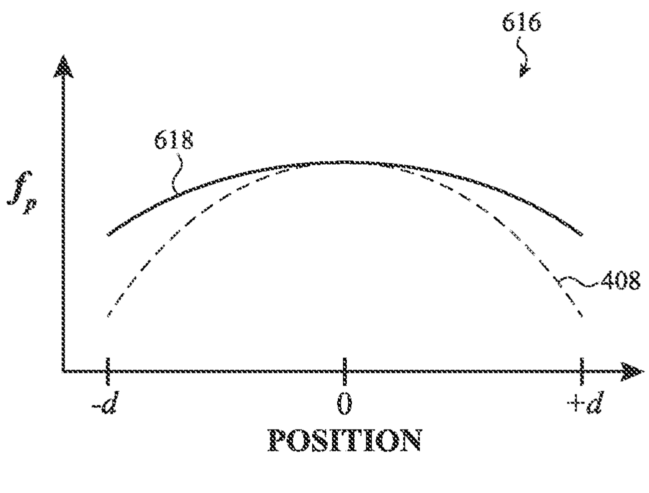
FIG. 6C shows a graph of a magnetic preload force as a function of displacement between the preloading plate and the magnet of the preloading arrangement of FIGS. 6A and 6B.

For example, if the magnet 610 is moved closer to the first column bar 607*a* along the minor axis 614 and the X-axis, the preloading force between the magnet 610 and the first column bar 607*a* will increase, whereas the preloading force between the magnet 610 and the second and third columns bars 607*b*, 607*c* will decrease. Overall, the loss in preloading force for this movement may be less than in other arrangements (such as that shown in FIGS. 4A and 4B). FIG. 6C shows a graph 606 of the preload force $f_p$ of a preloading arrangement as a function of relative position of a preloading plate thereof, with 0 representing the preloading plate centered with a magnet along the X-axis, and +d and −d representing the maximum displacement of the preloading plate along the X-axis during operation of the bearing actuator arrangement. The preloading force $f_p$, provided by the preloading arrangement 608 is indicated by line 618 in FIG. 6C, whereas the preloading force $f_p$, provided by the preloading arrangement of FIGS. 4A and 4B is indicated by line 408. As illustrated, the preloading arrangement 608 may provide a similar level of preloading force but with less roll-off across the stroke range.

The preloading plate 600 may be symmetric across one or more axes. For example, in some instances the preloading plate 600 may be symmetric across a first axis of symmetry. This first axis of symmetry may be parallel to the minor axis 614 of the first surface 612 of the magnet 610. Additionally or alternatively, the preloading plate may be symmetric across a second axis of symmetry that is parallel to the major axis of the first surface 612 of the magnet 610. Symmetry across a particular axis may provide symmetric force roll-off for movement along a particular axis (e.g., symmetry along the second axis of symmetry may provide for symmetric force roll-off for relative movement of the preloading arrangement 600 along the minor axis 614).

In some variations, the preloading plate 600 may include a first tab portion 606*a* extending from a first side of the preloading plate 600. When the preloading plate 600 is integrated into a moveable stage or stationary base structure using an insert molding process (e.g., as described above with respect to FIG. 5A), the first tab portion 606*a* may be used to hold the preloading plate 600 in the mold during the insert molding. In some variations where the preloading plate 600 includes the first tab portion 606*a*, the preloading plate 600 may optionally further include a second tab portion 606*b* that extends from a second side of the preloading plate 600 opposite the first side. While second tab portion 606*b* may not assist with the insert molding process, its presence may allow for the preloading plate 600 to maintain symmetry across one or more axes.

In the variation shown in FIG. 6A, the apertures 604*a*-604*d* may each have a rectangular shape, and accordingly the column bars 607*a*-607*c* and row bars 609*a*-609*c* each may have a constant width. In other variations, one or more of the set of apertures 604*a*-604*d* has a non-rectangular shape. In some of these variations, some or all of the column bars 607*a*-607*c* and/or row bars 609*a*-609*c* may have a varying width. The number and location of the apertures 604*a*-604*d* may determine the relative number of column bars 607*a*-607*c* and/or row bars 609*a*-609*c*. For example, the variation of the preloading plate 600 is configured as a two-dimensional grid that includes apertures positioned in multiple rows (e.g., a first row including apertures 604*a* and 604*b* and a second row including apertures 604*c* and 604*d*) and columns (e.g., a first column including apertures 604*a* and 604*c* and a second column including apertures 604*b* and 604*d*). In a two-dimensional grid, the preloading plate 600 includes three or more column bars and three or more row bars. Alternatively, the preloading plate 600 may be configured as a one-dimensional grid in which the apertures are positioned in a single row or a single column.

Figure 6D:
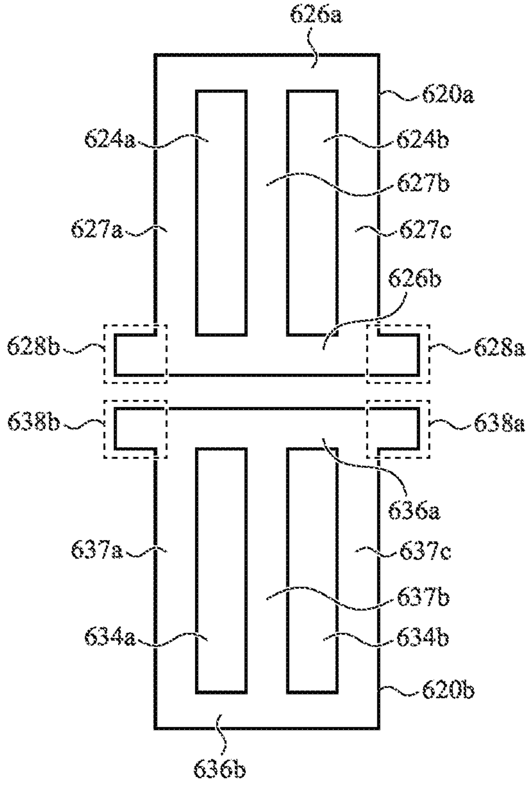
FIG. 6D shows a variation of a set of preloading plates that may be used with the preloading arrangement of FIGS. 6A and 6B.

While the preloading arrangement 608 shown in FIG. 6B shows a single preloading plate 600, in other variations the preloading arrangement 608 may include a plurality of preloading plates, each of which has a grid shape. The plurality of preloading plates may be connected to (e.g., attached to otherwise incorporated into) a moveable stage or stationary base structure (such as described above with respect to FIGS. 5A and 5B), and may be held in a fixed relationship to one another. The plurality of preloading plates is further positioned such that each preloading plate is positioned in the magnetic field of a magnet (e.g. magnet 610) of the preloading arrangement. FIG. 6D shows one such variation of a plurality of preloading plates 620 that may be used with the preloading arrangement 608 of FIG. 6B in place of a single preloading plate 600. As shown there, the plurality of preloading plates 620 includes a first preloading plate 620*a* and a second preloading plate 620*b*. It should be appreciated that in some of these instances, the preloading arrangement 608 includes one or more preloading plates that does not have a grid shape.

Each of the plurality of preloading plates 620 defines a set of apertures extending therethrough (e.g., the first preloading plate 620*a* defines a first set of apertures 624*a*-624*b* extending therethrough and the second preloading plate 620*b* defines a second set of apertures 634*a*-634*b*. The first preloading plate 620*a* and the second preloading plate 620*b* are each configured to have a grid shape, which may be a one-dimensional grid or a two-dimensional grid as discussed above. For example, the first preloading plate 620*a* is configured in FIG. 6D as a one-dimensional grid in which the first set of apertures 624*a*-624*b* is positioned along a single row to define a pair of row bars 626*a* and 626*b* and three or more column bars (e.g., three column bars 627*a*-627*b*). Similarly, the second preloading plate 620*b* is configured in FIG. 6D as a one-dimensional grid in which the second set of apertures 634*a*-634*b* is positioned along a single row to define a pair of row bars 636*a* and 636*b* and three or more column bars (e.g., three column bars 637*a*-637*b*).

The plurality of preloading plates 620 may be configured such that the plurality of preloading plates 620 is collectively symmetric across one or more axes of symmetry as discussed previously. For example, the plurality of preloading plates 620 may be symmetric across a first axis of symmetry that is positioned between the first and second preloading plates 620*a*, 620*b*. In these instances, the first preloading plate 620*a* may be the mirror image of the second preloading plate 620*b*. Additionally or alternatively, the plurality of preloading plates 620 may be symmetric across a second axis of symmetry that intersects the first and second preloading plates 620*a*, 620*b*.

Some or all of the plurality of preloading plates 620 may include a set of tab portions as described previously. For example, in some variations, the first preloading plate 620*a* may include a first tab portion 628*a* extending from a first side of the first preloading plate 620*a* (which may be used to hold the first preloading plate 620*a* in a mold during an insert molding process). In some variations where the first preloading plate 620*a* includes the first tab portion 628*a*, the first preloading plate 620*a* may optionally further include a second tab portion 628*b* that extends from a second side of the first preloading plate 620*a* opposite the first side. Similarly, the second preloading plate 620*b* may include a first tab portion 638*a* extending from a first side of the second preloading plate 620*b* (which may be used to hold the second preloading plate 620*b* in the mold during an insert molding process). In some variations where the second preloading plate 620*b* includes the first tab portion 638*a*, the second preloading plate 620*b* may optionally further include a second tab portion 638*b* that extends from a second side of the second preloading plate 620*b* opposite the first side.

Figure 7A:
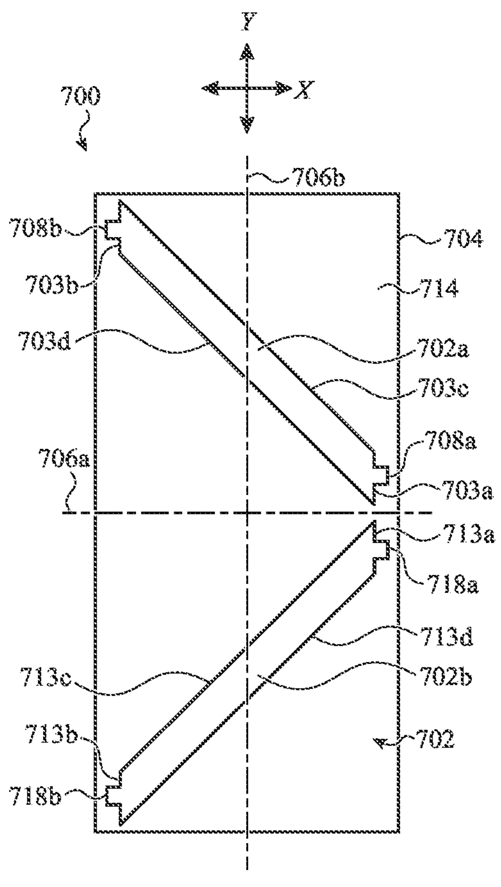
FIGS. 7A and 7B depict bottom and side views, respectively, of an example preloading arrangement as described herein.
Figure 7B:
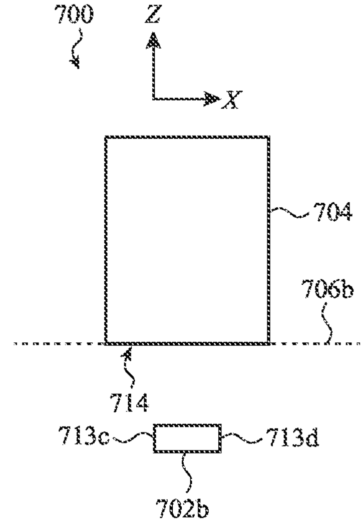

In some variations, a preloading arrangement may include one or more preloading plates (or portions thereof) that are positioned at a non-zero angle relative to each of the major and minor axes of a magnet surface. For example, FIGS. 7A and 7B show bottom and side views, respectively, of a preloading arrangement 700 that includes a set of preloading plates 702 and a magnet 704. The preloading plates 702 and magnet 704 are connected to (e.g., attached to or otherwise integrated into) corresponding components of a bearing actuator arrangement as discussed herein, and are positioned such that a corresponding first surface of each of the set of preloading plates 702 faces a first surface 714 of the magnet 704. For the purpose of discussion, the preloading arrangement 700 is positioned to provide a preloading force along the Z-axis, though it should be appreciated that this preloading force may be applied along any axis as may be desired).

The first surface 714 of the magnet 704 has a shape (e.g., a rectangular shape) having a minor axis 706*a* and a major axis 706*b*, and the set of preloading plates 702 is configured such that at least one edge of the set of preloading plates 702 is positioned at a corresponding non-zero angle relative to each of the minor axis 706*a* and the major axis 706*b*. For example, in the variation shown in FIGS. 7A and 7B, the set of preloading plates 702 includes a first preloading plate 702*a* and a second preloading plate 702*b*. In this variation, the first preloading plate 702*a* has a rhomboid-shaped region that faces the first surface 714 of the magnet 704. This rhomboid-shaped region is defined by a first pair of parallel edges 703*a*, 703*b*, and a second pair of parallel edges 703*c*, 703*d*. As shown, each of the second pair of parallel edges 703*c*, 703*d* is angled (i.e., at a corresponding non-zero angle) relative to both the minor axis 706*a* and the major axis 706*b* of the first surface 714 of the magnet 704. While shown in FIG. 7A as forming a 45 degree angle relative to both the minor axis 706*a* and the major axis 706*b*, it should be appreciated that second pair of parallel edges 703*c*, 703*b* may be positioned at different angels relative to these axes (e.g., 60 degrees relative to the minor axis 706*a* and 30 degrees relative to the major axis 706*b,* 30 degrees relative to the minor axis 706*a* and 60 degrees relative to the major axis 706*b*, or the like). The first set of parallel edges 703*a*, 703*b* may be parallel to one of the minor axis 706*a* or the major axis 706*b*, but need not be.

Similarly, the second preloading plate 702*b* has a rhomboid-shaped region that faces the first surface 714 of the magnet. 704 This rhomboid-shaped region is defined by a first pair of parallel edges 713*a*, 713*b*, and a second pair of parallel edges 713*c*, 713*d*. As shown, each of the second pair of parallel edges 713*c*, 713*d* is angled (i.e., at a corresponding non-zero angle) relative to both the minor axis 706*a* and the major axis 706*b* of the first surface 714 of the magnet 704. The first set of parallel edges 713*a*, 713*b* may be parallel to one of the minor axis 706*a* or the major axis 706*b*, but need not be.

In some instances, the set of preloading plates 702 may be symmetric across a first axis of symmetry that is positioned between the first and second preloading plates 702*a*, 702*b*. In these instances, the first preloading plate 702*a* may be a mirror image of the second preloading plate 702*b*. Additionally or alternatively, the widths of the first and second preloading plates 702*a*, 702*b* may be constant across a length of the rhomboid-shaped regions (i.e., along the seconds pair of parallel edges 703*c*-703*d* and 713*c*-713*d*). Collectively, arranging the first and second preloading plates 702*a*, 702*b* as shown in FIGS. 7A and 7B may improve the preloading force roll-off and/or may decrease the return force generated (as compared to the preloading arrangement shown in FIGS. 4A and 4B) during relative motion between the magnet 704 and the set of preloading plates 702*a*, 702*b*.

Some or all of the set of preloading plates 702 may include a set of tab portions as described previously. For example, in some variations, the first preloading plate 702*a* may include a first tab portion 708*a* extending from the first edge 703*a* of its rhomboid-shaped region (which may be used to hold the first preloading plate 702*a* in a mold during an insert molding process). In some variations where the first preloading plate 702*a* includes the first tab portion 708*a*, the first preloading plate 702*a* may optionally further include a second tab portion 708*b* that extends from the second edge 703*b* of the rhomboid-shaped region. Similarly, the second preloading plate 702*b* may include a first tab portion 718*a* extending from a first edge 713*a* of its rhomboid-shaped region (which may be used to hold the second preloading plate 702*b* in the mold during an insert molding process). In some variations where the second preloading plate 702*b* includes the first tab portion 718*a*, the second preloading plate 702*b* may optionally further include a second tab portion 718*b* that extends from the second edge 713*b* of the rhomboid-shaped region.

Figure 7C:
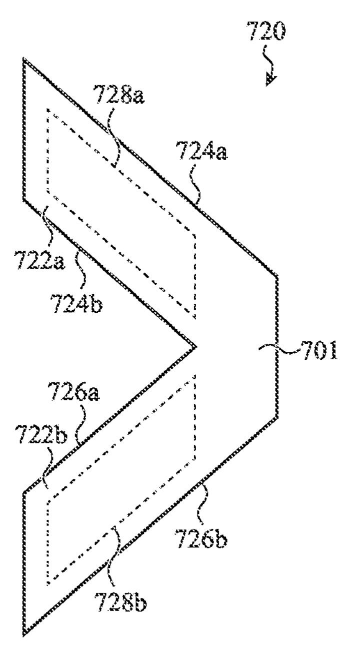
FIGS. 7C-7E show top views of variations of preloading plates that may be used with the preloading arrangement of FIGS. 7A and 7B.

FIG. 7C shows another example of a preloading plate 720 that may be used in the preloading arrangement 700 of FIGS. 7A-7B. In this variation, the preloading plate 720 has V-shaped surface 701 that is positioned to face the first surface 714 of the magnet 704. The V-shaped surface 701 may include a first arm 722*a* connected to a second arm 722*b*. The first arm 722*a* includes a pair of edges 724*a*, 724*b* that are positioned at a corresponding non-zero angle to each of the minor axis 706*a* and the major axis 706*b* of the first surface 714. Similarly, the second arm 722*b* includes a pair of edges 726*a*, 726 that are positioned at a corresponding non-zero angle to each of the minor axis 706*a* and the major axis 706*b* of the first surface 714 of the magnet 704. The preloading plate 720 may be symmetric along an axis of symmetry. In some instances, the preloading plate 720 may include one or more tab portions (not shown) extending from one or more sides of the preloading plate 720, such as described in more detail herein. Additionally or alternatively, one or both of the first and second arms 722*a*, 722*b* may define an aperture extending therethrough (e.g., a first aperture 728*a* extending through the first arm 722*a* and a second aperture 728*b* extending through the second arm are shown in FIG. 7C).

Figure 7D:
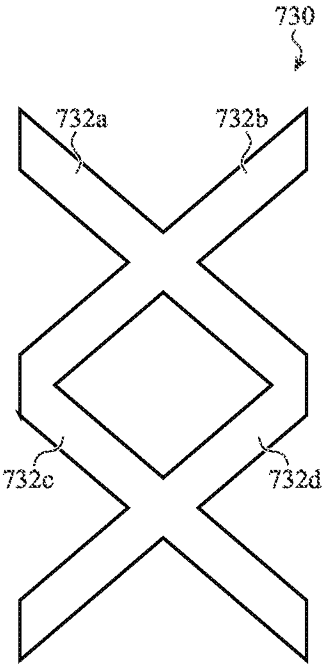

FIG. 7D shows another example of preloading plate 730 that may be used in the preloading arrangement 700 of FIGS. 7A-7B. In this variation, a surface of the preloading plate 730 (that is positioned to face the first surface 714 of the magnet 704) includes a set of bars 732*a*-732*d* that cross to form a set X-shaped regions. Each of these bars include one or more edges (not individually labeled) that are positioned at a corresponding non-zero angle relative to each of the minor axis 706*a* and the major axis 706*b* of the first surface 714 of the magnet 704. Specifically, the preloading plate 730 include a first bar 732*a* and a second bar 732*b* (each of which may have a rhomboid shape) that cross to form a first X-shaped region, as well as a third bar 732*c* and a fourth bar 732*d* (each of which may have a rhomboid shape) that cross to form a second X-shaped region. The relative widths of the set of bars 732*a*-732*d* and the angles at which different bars cross may be used to tailor the preloading force roll-off and/or the return forces as described previously. The preloading plate 730 may be symmetric across one or more axes, and is shown in FIG. 7D as having two different axes of symmetry. In some instances, the preloading plate 730 may include one or more tab portions (not shown) extending from one or more sides of the preloading plate 730, such as described in more detail herein.

Figure 7E:
Figure 7E:
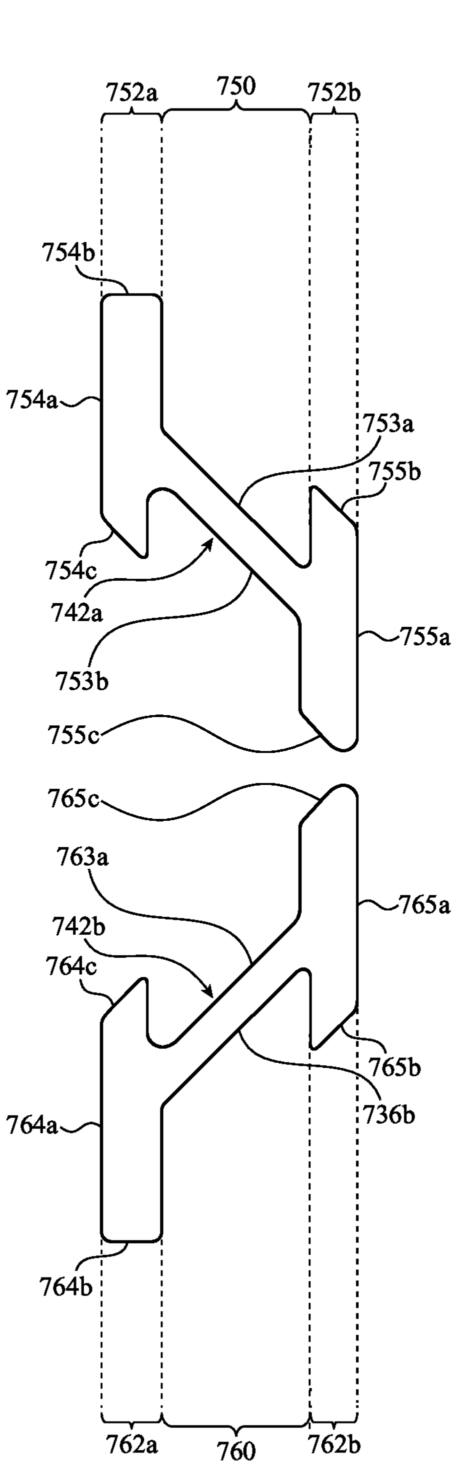

FIG. 7E shows another example of a set of preloading plates 740 that may be used in the preloading arrangement 700 of FIGS. 7A-7B. In this variation, the set of preloading plates 740 includes at least one preloading plate that has an intermediate section positioned between two end sections, where the intermediate section is narrower than the end sections and is defined by edges that are positioned at a corresponding non-zero angle relative to each of the minor axis 706*a* and the major axis 706*b* of the first surface 714 of the magnet 704. For example, in the variation shown in FIGS. 7A and 7B, the set of preloading plates 740 includes a first preloading plate 742*a* and a second preloading plate 742*b*. A surface of the first preloading plate 742*a* that faces the first surface 714 of the magnet 704 has a shape that includes an intermediate section 750 positioned between a first end section 752*a* and a second end section 752*b*, such that the intermediate section 750 connects the first end section 752*a* to the second end section 752*b*. The intermediate section 750 may be narrower along the major axis 706*b* than each of the first end section 752*a* and the second end section 752*b* (e.g., a width of the intermediate section 750 along the major axis 706*b* may be less than corresponding widths of the first and second end sections 752*a*, 752*b* along the major axis 706*b*).

The intermediate section 750 may be defined by a pair of edges (including a first edge 753*a* and a second edge 753*b* of the intermediate section 750), each of which connects the first end section 752*a* to the second end section 752*b*. Additionally, the first and second edges 753*a*, 753*b* of the intermediate section 750 may be positioned at corresponding non-zero angles relative to each of the minor axis 706*a* and the major axis 706*b* of the first surface 714 of the magnet 704. In some variations, the first and second edges 753*a*, 753*b* are parallel, such that they are positioned at the same non-zero angle relative to each of the minor axis 706*a* and the major axis 706*b*. Configuring the first preloading plate 742*a* may adjust the force roll-off and/or return forces as described previously.

The first and second end sections 752*a*, 752*b* may have any suitable shape (e.g., a rectangular shape, a rhomboidal shape, or the like). In some variations, the first end section 752*a* and/or the second end section 752*b* may have one or more edges that are parallel to the major axis 706*b*. For example, in the variation shown in FIG. 7E, the first end section 752*a* includes a first edge 754*a* that is positioned parallel to the major axis 706*b*. Similarly, the second end section 752*b* includes a first edge 755*a* that is positioned parallel to the major axis 706*b*. Additionally or alternatively, the first end section 752*a* and/or the second end section 752*b* may have one or more edges that are parallel to the minor axis 706*a*. For example, in the variation shown in FIG. 7E, the first end section 752*a* includes a second edge 754*b* that is parallel to the minor axis 706*a*. Additionally or alternatively, the first end section 752*a* and/or the second end section 752*b* may have one or more edges that are positioned at non-zero angles relative to each of the minor axis 706*a* and the major axis 706*b*. For example, in the variation shown in FIG. 7E, the first end section 752*a* includes a third edge 754*c* that is parallel to the minor axis 706*a*. Similarly, the second end section 752*b* shown in FIG. 7E includes a second edge 755*b* and a third edge 755*c*, each of which is positioned at a corresponding non-zero angle relative to each of the minor axis 706*a* and the major axis 706*b*.

Similarly, a surface of the second preloading plate 742*b* that faces the first surface 714 of the magnet 704 has a shape that includes an intermediate section 760 positioned between a first end section 762*a* and a second end section 762*b*, such that the intermediate section 760 connects the first end section 762*a* to the second end section 762*b*. The intermediate section 760 may be narrower along the major axis 706*b* than each of the first end section 762*a* and the second end section 762*b* (e.g., a width of the intermediate section 760 along the major axis 706*b* may be less than corresponding widths of the first and second end sections 762*a*, 762*b* along the major axis 706*b*).

The intermediate section 760 of the second preloading plate 742*b* may be defined by a pair of edges (including a first edge 763*a* and a second edge 763*b* of the intermediate section 760), each of which connects the first end section 762*a* to the second end section 762*b*. Additionally, the first and second edges 763*a*, 763*b* of the intermediate section 760 may be positioned at corresponding non-zero angles relative to each of the minor axis 706*a* and the major axis 706*b* of the first surface 714 of the magnet 704. In some variations, the first and second edges 763*a*, 763*b* are parallel, such that they are positioned at the same non-zero angle relative to each of the minor axis 706*a* and the major axis 706*b*.

The first and second end sections 762*a*, 762*b* of the second preloading plate 742*b* may have any suitable shape (e.g., a rectangular shape, a rhomboidal shape, or the like). In some variations, the first end section 762*a* and/or the second end section 762*b* may have one or more edges that are parallel to the major axis 706*b*. For example, in the variation shown in FIG. 7E, the first end section 762*a* includes a first edge 764*a* that is positioned parallel to the major axis 706*b*. Similarly, the second end section 762*b* includes a first edge 765*a* that is positioned parallel to the major axis 706*b*. Additionally or alternatively, the first end section 762*a* and/or the second end section 762*b* may have one or more edges that are parallel to the minor axis 706*a*. For example, in the variation shown in FIG. 7E, the first end section 762*a* includes a second edge 764*b* that is parallel to the minor axis 706*a*. Additionally or alternatively, the first end section 762*a* and/or the second end section 762*b* may have one or more edges that are positioned at non-zero angles relative to each of the minor axis 706*a* and the major axis 706*b*. For example, in the variation shown in FIG. 7E, the first end section 762*a* includes a third edge 754*c* that is parallel to the minor axis 706*a*. Similarly, the second end section 762*b* shown in FIG. 7E includes a second edge 765*b* and a third edge 765*c*, each of which is positioned at a corresponding non-zero angle relative to each of the minor axis 706*a* and the major axis 706*b*.

In some instances, the set of preloading plates 740 of FIG. 7E may be symmetric across a first axis of symmetry that is positioned between the first and second preloading plates 742*a*, 742*b*. In these instances, the first preloading plate 742*a* may be a mirror image of the second preloading plate 742*b*. In some instances, the first and second preloading plates 742*a*, 742*b*, may be positioned such that the respective first end sections 752*a*, 762*a* thereof are further apart than the respective second end sections 752*b*, 762*b* thereof. Specifically, the first end section 752*a* of the first preloading plate 742*a* may be separated from the first end section 762*a* of the second preloading plate 742*b* by a first distance, and the second end section 752*b* of the first preloading plate 742*a* may be separated from the second end section 762*b* of the second preloading plate 742*b* by a second distance that is less than the first distance. Collectively, arranging the first and second preloading plates 742*a*, 742*b* as shown in FIG. 7E may improve the preloading force roll-off and/or may decrease the return force generated (as compared to the preloading arrangement shown in FIGS. 4A and 4B) during relative motion between the magnet 704 and the set of preloading plates 740.

Figure 8:
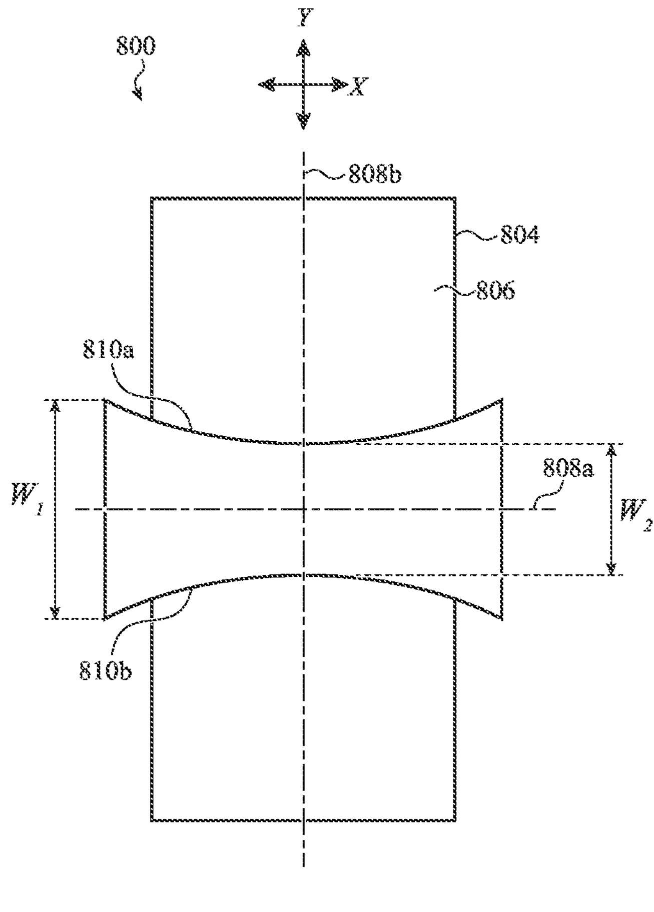
FIG. 8 shows a bottom view of a variation of a preloading arrangement as described herein.

In some variations, a preloading arrangement may include a preloading plate having a varying width. For example, FIG. 8 shows a bottom view of a variation of preloading arrangement 800 having a preloading plate 802 and a magnet 804. The preloading arrangement 800 is configured such that the magnet 804 has a first surface 806 positioned to face preloading plate 802. The first surface 806 has a shape (e.g., a rectangular shape) having a minor axis 808*a* and a major axis 808*b* as discussed in more detail previously. The preloading plate 802 may be configured to have a width that varies along a length of the preloading plate 802. For example, the preloading plate 802 may include a first concave edge 810*a* and a second concave edge 810*b*. These edges 810*a*, 810*b* may be curved such that they curve away from each other, which may define a region of the preloading plate 802 that has an hourglass shape. In this way, the width of the preloading plate 802 decrease from a wider width $W_1$ at the edges of the preloading plate 802 to a narrower width $W_2$ at the middle of the preloading plate 802. In this way, the first surface 806 of the magnet 804 will be positioned over different widths of the preloading plate 802 as it moves along the X-axis, which may adjust the force roll-off and/or return forces as described previously. The width of the preload plate may be tailored to increase or decrease in any manner to adjust the pre-loading forces across a stroke range of the bearing actuator arrangement.

Figure 9A:
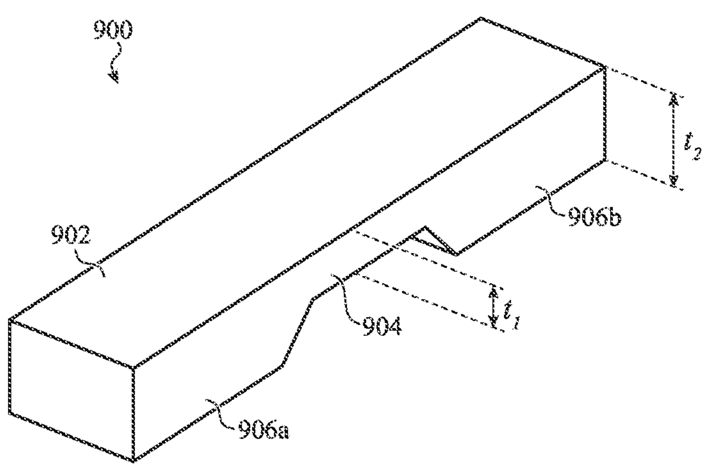
FIGS. 9A and 9B show perspective views of preloading plates that may be used with the preloading arrangements described herein.

In any of the previously described embodiments, the preloading arrangements may include planar preloading plates having a constant thickness (i.e., constant along a direction of the magnetic preloading force between the preloading plate and the magnet). In some instances, however, any of the preloading plates described herein may have one or more non-planar regions and/or regions with different width. For example, FIG. 9A shows a variation of a preloading plate 900 having varying thickness. Specifically, the preloading plate 900 has a first surface 902 that, when the preloading plate 900 is incorporated into a preloading arrangement having a magnet, faces a corresponding first surface of the magnet. The preloading plate 900 has a first region 904 having a first thickness $t_1$ (i.e., in a direction perpendicular to the first surface 902) and one or more second regions 906*a*-906*b* having a second thickness $t_2$ (i.e., in a direction perpendicular to the first surface 902) that is larger than the first thickness $t_1$. In these instances, the first region 904 may provide less preloading force than a similarly sized portion of the second regions 906*a*-906*b*, due to its reduced thickness. Accordingly, the thickness of the preloading plates may be designed to further adjust the pre-loading forces and/or return forces between the preloading plate 900 and a magnet of the preloading arrangement.

Figure 9B:
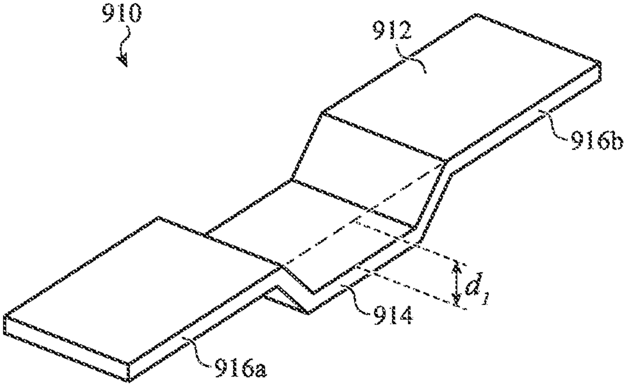

Similarly, FIG. 9B shows a variation of a preloading plate 910. As shown there, the preloading plate 910 a first surface 912 that, when the preloading plate 910 is incorporated into a preloading arrangement having a magnet, faces a corresponding first surface of the magnet. The preloading plate 910 has a first region 914 (i.e., in a direction perpendicular to the first surface 912) that is recessed relative to one or more second regions 916*a*-916*b* of the first surface by a distance $d_1$. When the preloading plate 910 is incorporated into the preloading arrangement, the first region 914 will be further away from the first surface of the magnet as compared to the one or more second regions 916*a*-916*b*. In these instances, the first region 914 may provide less preloading force than a similarly sized portion of the second regions 916*a*-916*b*, due to its increased spacing from the magnet. The preloading plate 910 may be stamped, dented or otherwise shaped with a non-planar configuration to further adjust the pre-loading forces and/or return forces between the preloading plate 900 and a magnet of the preloading arrangement.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A camera comprising:

an optical assembly comprising:
 an image sensor; and
 a lens assembly having one or more lens groups; and
a bearing actuator arrangement configured to move at least one component of the optical assembly, wherein:
the bearing actuator arrangement comprises a preloading arrangement configured to provide a magnetic preloading force between a first component of the bearing actuator arrangement and a second component of the bearing actuator arrangement;
the preloading arrangement comprises:
 a magnet connected to the first component and having a magnetic field; and
 a set of preloading plates connected to the second component and positioned in the magnetic field;
the magnet has a first surface facing the set of preloading plates and having a shape with a minor axis and major axis; and
the set of preloading plates has a second surface that faces the first surface and includes at least a set of parallel edges positioned under the magnet, the set of parallel edges positioned at a non-zero angle relative to each of the minor axis and the major axis.

2. The camera of claim 1, wherein:

the set of preloading plates comprises a first preloading plate and a second preloading plate.

3. The camera of claim 2, wherein:
the first preloading plate includes the second surface.
4. The camera of claim 3, wherein:
the second preloading plate includes a third surface facing the first surface and having first and second parallel edges; and
the first and second parallel edges of the third surface are positioned at corresponding non-zero angles relative to each of the minor axis and the major axis.
5. The camera of claim 2 wherein:
the set of preloading plates is symmetric across an axis of symmetry positioned between the first preloading plate and the second preloading plate.
6. The camera of claim 1, wherein:
the bearing actuator arrangement comprises a first stage and a second stage;
the first stage and the second stage are separated by one or more sets of ball bearings; and
the first component of the bearing actuator arrangement is the first stage and the second component of the bearing actuator arrangement is the second stage.
7. The camera of claim 6, wherein:
the bearing actuator arrangement comprises a third stage positioned between the first stage and the second stage;
the first stage is separated from the third stage by a first set of ball bearings; and
the second stage is separated from the third stage by a second set of ball bearings.
8. The camera of claim 1, wherein:
the shape of the first surface is a rectangle.
9. The camera of claim 1, wherein:
the set of preloading plates comprises a first preloading plate having a first arm and second arm;
the first arm has a pair of edges positioned at corresponding non-zero angles relative to each of the minor axis and the major axis; and
the second arm has a pair of edges positioned at corresponding non-zero angles relative to each of the minor axis and the major axis.
10. The camera of claim 1, wherein:
the set of preloading plates comprises a first preloading plate having a first end segment, a second end segment;
an intermediate segment comprises a first edge and a second edge each connecting the first end segment to the second end segment; and
the first edge and the second edge of the intermediate segment are positioned at corresponding non-zero angles relative to each of the minor axis and the major axis.
11. A camera comprising:
an optical assembly comprising:
an image sensor; and
a lens assembly having one or more lens groups; and
a bearing actuator arrangement configured to move at least one component of the optical assembly, wherein:
the bearing actuator arrangement comprises a preloading arrangement configured to provide a magnetic preloading force between a first component of the bearing actuator arrangement and a second component of the bearing actuator arrangement;
the preloading arrangement comprises:
a magnet connected to the first component and having a magnetic field; and
a set of preloading plates connected to the second component and positioned in the magnetic field;
the magnet has a first surface facing the set of preloading plates and having a shape with a minor axis and major axis;
the set of preloading plates comprises a first preloading plate and a second preloading plate positioned under the magnet; and
the first preloading plate has a second surface that faces the first surface and includes at least one edge positioned at a non-zero angle relative to each of the minor axis and the major axis.
12. The camera of claim 11, wherein:
the second surface has first and second parallel edges; and
the first and second parallel edges of the second surface are positioned at corresponding non-zero angles relative to each of the minor axis and the major axis.
13. The camera of claim 12, wherein:
the second preloading plate includes a third surface facing the first surface and having first and second parallel edges; and
the first and second parallel edges of the third surface are positioned at corresponding non-zero angles relative to each of the minor axis and the major axis.
14. The camera of claim 11 wherein:
the set of preloading plates is symmetric across an axis of symmetry positioned between the first preloading plate and the second preloading plate.
15. The camera of claim 11, wherein:
the bearing actuator arrangement comprises a first stage and a second stage;
the first stage and the second stage are separated by one or more sets of ball bearings; and
the first component of the bearing actuator arrangement is the first stage and the second component of the bearing actuator arrangement is the second stage.
16. The camera of claim 15, wherein:
the bearing actuator arrangement comprises a third stage positioned between the first stage and the second stage;
the first stage is separated from the third stage by a first set of ball bearings; and
the second stage is separated from the third stage by a second set of ball bearings.
17. The camera of claim 11, wherein:
the shape of the first surface is a rectangle.

* * * * *